US010766701B2

(12) United States Patent
Manley

(10) Patent No.: US 10,766,701 B2
(45) Date of Patent: Sep. 8, 2020

(54) SELF-LEVELING BIN ASSEMBLY

(71) Applicant: Feedall, LLC, Willoughby, OH (US)

(72) Inventor: Thomas E. Manley, Mentor, OH (US)

(73) Assignee: Feedall, LLC, Willoughby, OH (US)

( * ) Notice: Subject to any disclaimer, the term of this patent is extended or adjusted under 35 U.S.C. 154(b) by 0 days.

(21) Appl. No.: 16/357,631

(22) Filed: Mar. 19, 2019

(65) Prior Publication Data

US 2019/0291953 A1    Sep. 26, 2019

Related U.S. Application Data

(60) Provisional application No. 62/646,413, filed on Mar. 22, 2018.

(51) Int. Cl.
*B65G 1/07* (2006.01)

(52) U.S. Cl.
CPC ............ *B65G 1/07* (2013.01); *B62B 2203/13* (2013.01)

(58) Field of Classification Search
CPC .............................. B65G 1/07; B65G 2203/13
USPC ....... 187/244, 240, 222, 231, 243, 267, 269; 312/71, 312, 306; 211/59.3, 1.51; 220/559; 108/145, 144.11, 146, 136; 280/47.35, 47.29, 79.3
See application file for complete search history.

(56) References Cited

U.S. PATENT DOCUMENTS

| | | | |
|---|---|---|---|
| 2,044,394 A | 6/1936 | Marchand | |
| 2,806,607 A | 9/1957 | Komgold et al. | |
| 3,072,314 A * | 1/1963 | Keene | B65B 5/108 206/386 |
| 3,381,634 A | 5/1968 | Rothschild | |
| 3,475,069 A | 10/1969 | Saunders et al. | |
| 3,659,535 A * | 5/1972 | Cerney | A47B 9/02 108/136 |
| 3,663,078 A * | 5/1972 | Moore | B65G 1/07 312/71 |
| 3,972,454 A * | 8/1976 | Croley | B65D 5/726 222/541.6 |
| 4,261,079 A * | 4/1981 | Masini | B65H 54/84 141/270 |
| 4,285,435 A * | 8/1981 | Brinkers | B65G 1/07 211/59.2 |
| 4,473,922 A | 10/1984 | Weihe | |
| 4,926,760 A | 5/1990 | Sack | |
| 5,375,741 A * | 12/1994 | Harris | B65D 11/10 222/105 |
| 5,403,081 A * | 4/1995 | Anderson | A47F 3/0486 312/116 |
| 5,542,500 A * | 8/1996 | Emrey | B62B 3/04 187/244 |

(Continued)

FOREIGN PATENT DOCUMENTS

DE     4102292    *  7/1992
DE    19948940    *  4/2000
(Continued)

*Primary Examiner* — Janet M Wilkens
(74) *Attorney, Agent, or Firm* — Rankin, Hill & Clark LLP

(57) ABSTRACT

A self-leveling bin assembly includes a docking station, a bin received in or on the docking station, a bottom member or parts tray movably received in the bin, and a lifting mechanism provided as part of the docking station. The lifting mechanism is configured to lift or raise the parts tray within the bin as associated material located on the parts tray is selectively removed.

15 Claims, 8 Drawing Sheets

(56) References Cited

U.S. PATENT DOCUMENTS

| | | | |
|---|---|---|---|
| 6,017,040 A | 1/2000 | Mills | |
| 6,364,330 B1 * | 4/2002 | Weber | B62B 1/10 |
| | | | 108/136 |
| 6,537,017 B2 | 3/2003 | Stone | |
| 6,648,138 B1 * | 11/2003 | Kelly | A63B 47/002 |
| | | | 206/315.9 |
| 7,431,173 B2 * | 10/2008 | Thorpe | B65D 19/385 |
| | | | 206/511 |
| 7,445,126 B2 * | 11/2008 | Wilson | A47F 3/14 |
| | | | 211/1.51 |
| 8,052,120 B2 * | 11/2011 | Bacon | B66F 7/0625 |
| | | | 180/168 |
| 8,100,264 B2 * | 1/2012 | Wood | B65D 19/12 |
| | | | 206/600 |
| 2002/0046981 A1 | 4/2002 | Amish | |
| 2004/0195792 A1 * | 10/2004 | Baldwin | B62B 3/04 |
| | | | 280/47.27 |
| 2006/0219610 A1 * | 10/2006 | Varney | B07C 3/008 |
| | | | 209/584 |
| 2017/0361176 A1 | 12/2017 | Sherr | |

FOREIGN PATENT DOCUMENTS

| | | | |
|---|---|---|---|
| DE | 102004048428 | * | 4/2006 |
| DE | 102008055791 | * | 6/2010 |
| DE | 202018005541 | * | 12/2018 |
| EP | 2065333 | * | 6/2009 |
| FR | 2764581 | * | 12/1998 |

* cited by examiner

SELF-LEVELING BIN ASSEMBLY

The present application claims priority to Provisional Patent Application Ser. No. 62/646,413 filed Mar. 22, 2018, which is incorporated herein by reference.

BACKGROUND

The present disclosure relates to a self-leveling bin assembly for use, for example, with a robotic pick-up system for removing material or parts from a parts bin of the bin assembly.

A robotic pick-up system typically uses a camera or some other vision system to locate a part to be picked up and transported to another location. Robotic pick-up systems are generally very efficient at removing parts from a table where the parts are evenly distributed on the table and there is only one "layer" of parts, i.e., the parts are not stacked on one another. Issues arise when the parts to be picked up are placed into a bin and the parts are stacked in a random manner resulting in several layers of parts especially in deep bins where the bin sidewalls can cause challenges for the robot's clearances for picking.

The general concept of self-leveling tables are known in the art, which require some type of spring or related mechanism to raise the table as material is removed from the table. However, one drawback of the prior art self-leveling tables is that the table typically includes cumbersome framework with the spring or related mechanism permanently interconnecting the table to the framework. Also, these known self-leveling tables are not designed to be used with a robotic pick-up system.

SUMMARY

According to one aspect, a self-leveling bin assembly comprises a docking station, a bin received in or on the docking station, a bottom member or parts tray movably received in the bin, and a lifting mechanism provided as part of the docking station. The lifting mechanism is configured to lift or raise the parts tray within the bin as associated material located on the parts tray is selectively removed.

According to another aspect, a self-leveling bin assembly comprises a bin for receiving associated material therein. The bin includes a bottom wall having a lower opening and at least one sidewall. A parts tray is seated on the bin bottom wall and movable within the bin. The parts tray includes a bottom wall and at least one sidewall having a beveled shape. A lifting mechanism is provided beneath the bin and configured to lift the parts tray within the bin as associated material located on the parts tray is selectively removed. The beveled shape of the parts tray sidewall moves the associated material contained within the bin away from the bin sidewall as the parts tray is raised within the bin by the lifting mechanism.

DETAILED DESCRIPTION

Figure 1:
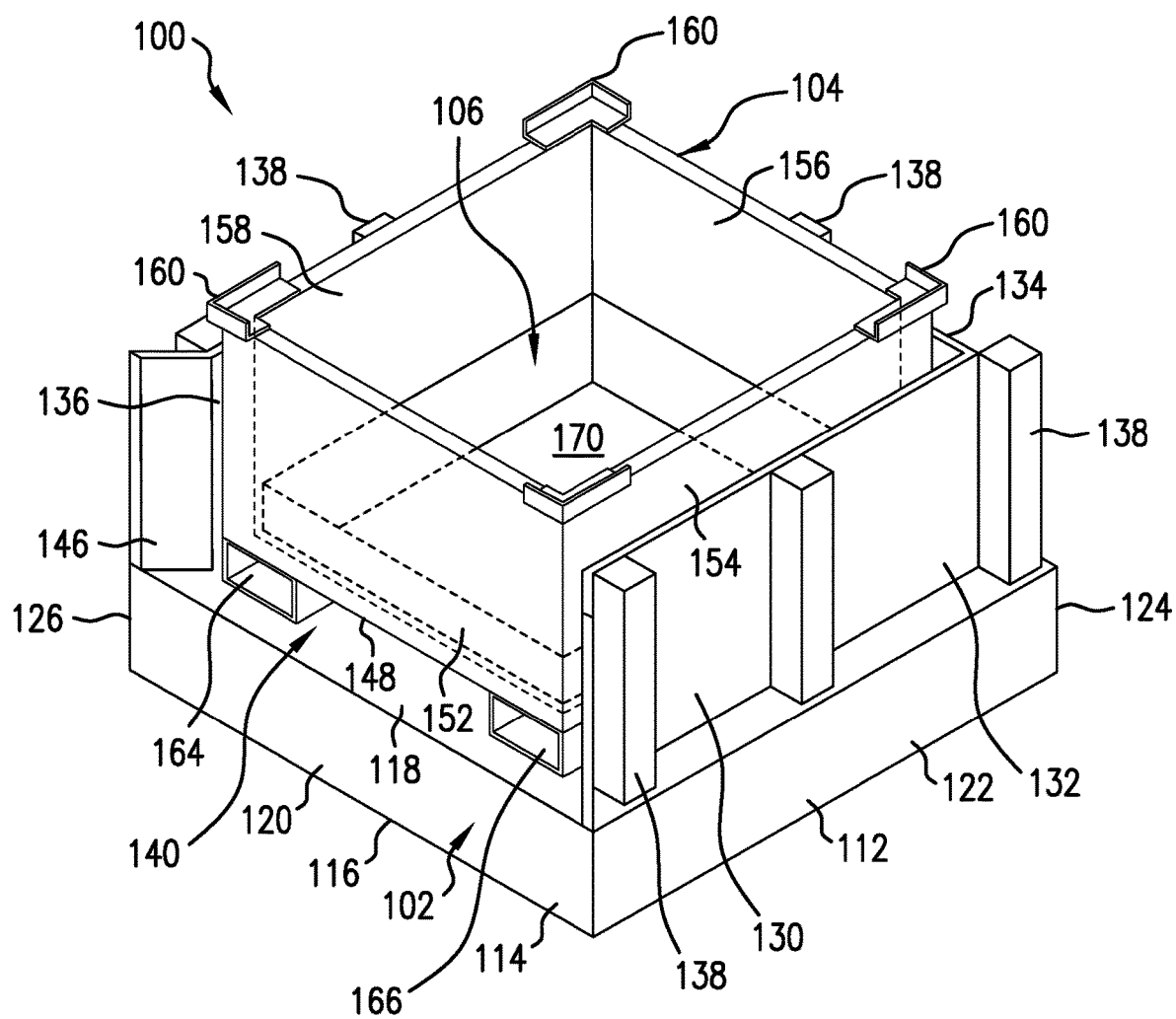
FIGS. 1-3 are perspective views of an exemplary self-leveling bin assembly according to the present disclosure.
Figure 2:
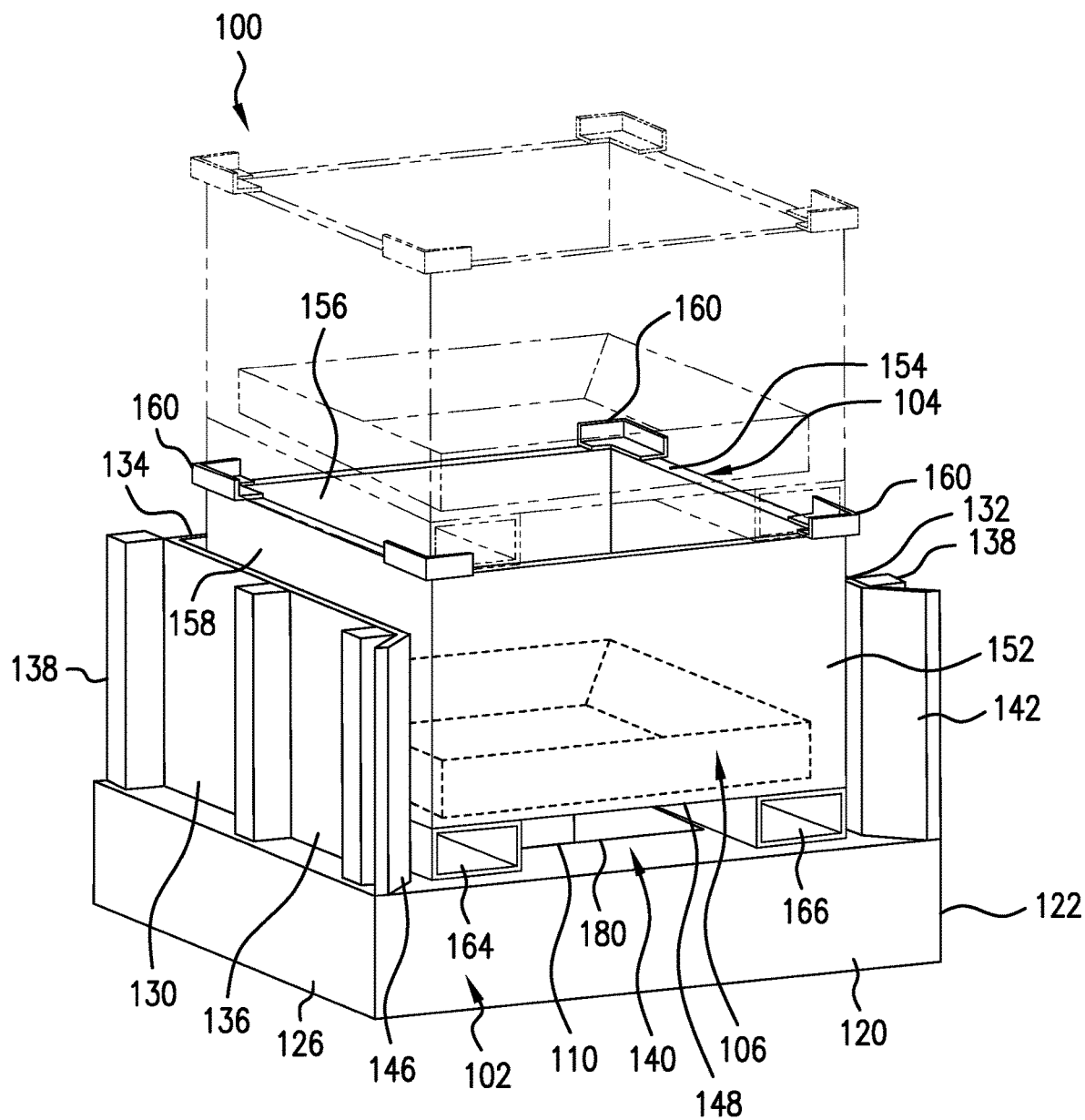
Figure 3:
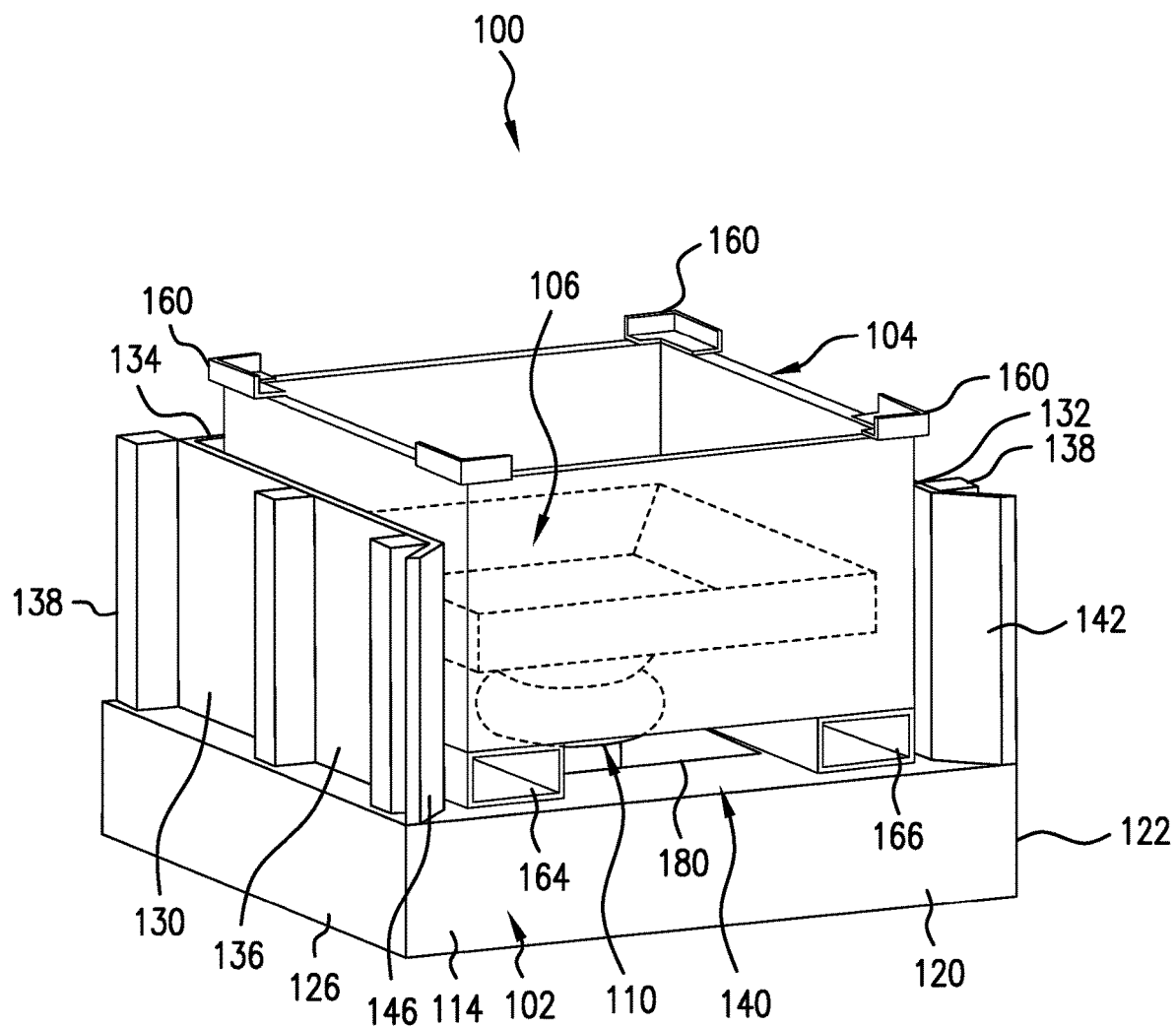

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1-5 illustrate an exemplary self-leveling bin assembly 100 according to the present disclosure. The bin assembly 100 generally includes a docking station 102, a bin 104 received in or on the docking station 102, a bottom member or parts tray 106 movably received in the bin 104, and a lifting mechanism 110 provided as part of the docking station 102 and configured to lift the parts tray 106 within the bin 104 as material located on the parts tray 106 is selectively removed by, for example, a robotic pick-up system. The materials used to make the bin assembly 100 and bin 104 can be determined by the type of material in the picking application. As an example, the material can be made of high grade steel or of a polymer such as a nylon plastic.

According to one example, the docking station 102 includes a base 114 having a bottom wall 116, a top wall 118, and at least one sidewall 120 extending between the bottom wall 116 and the top wall 118. In the depicted embodiment, the base 114 is rectangular shaped in top plan view and includes sidewalls 120, 122, 124, 126. Although, it should be appreciated that depending on the particular use of the bin assembly 100 alternative shapes for the base 114 are contemplated. For example, the base 114 can be round in top plan view including one continuous sidewall 120 extending between the bottom and top walls 116, 118. The docking station 102 further includes a fence 130 affixed to and extending substantially about a perimeter of the top wall 118. The fence 130 is defined by wall sections 132, 134, 136 which extend along the length direction of the respective sidewalls 122, 124, 126 and vertical supports 138 which provide strength and rigidity to the walls sections. An opening 140 defined by the fence 130 is sized to receive the bin 104, and end portions 142, 146 of the respective wall sections 132, 136 can be flared to allow for ease of insertion of the bin 104 into the docking station 102.

The bin 104 includes a bottom wall 148 having a lower opening 150. The bin 104 also includes at least one sidewall 152 extending from the bottom wall 148. It should be appreciated that the bin 104 is shaped corresponding to the shape of the base 114, more particularly the fence 130, of the docking station 102. Therefore, the depicted bin 104 is rectangular shaped in top plan view and includes sidewalls 152, 154, 156, 158. Each of the sidewalls 152, 154, 156, 158 can have a flat or planar interior surface. In the depicted aspect, a height dimension of the bin sidewalls is greater than a height dimension of the fence 130. Further, corner mounts 160, which can allow for stacking of multiple empty bins (see FIG. 2), can be secured to the bin 104.

According to one aspect, the bin 104 is removably received in the docking station 102. Therefore, in order for a user to move the bin 104 into and out of the docking station 102 a pair of elongated supports 164, 166 are mounted to the bottom wall 148, the supports 164, 166 adapted to receive stakes of a forklift. As depicted, the supports 164, 166 are channel-shaped, and more particularly, are rectangular shaped tubes that may not run the entire depth of the bin 104 to provide clearance for the lifting mechanism 110. However, it should be appreciated that the bin 104 can be fixed to the docking station 102.

Figure 4:
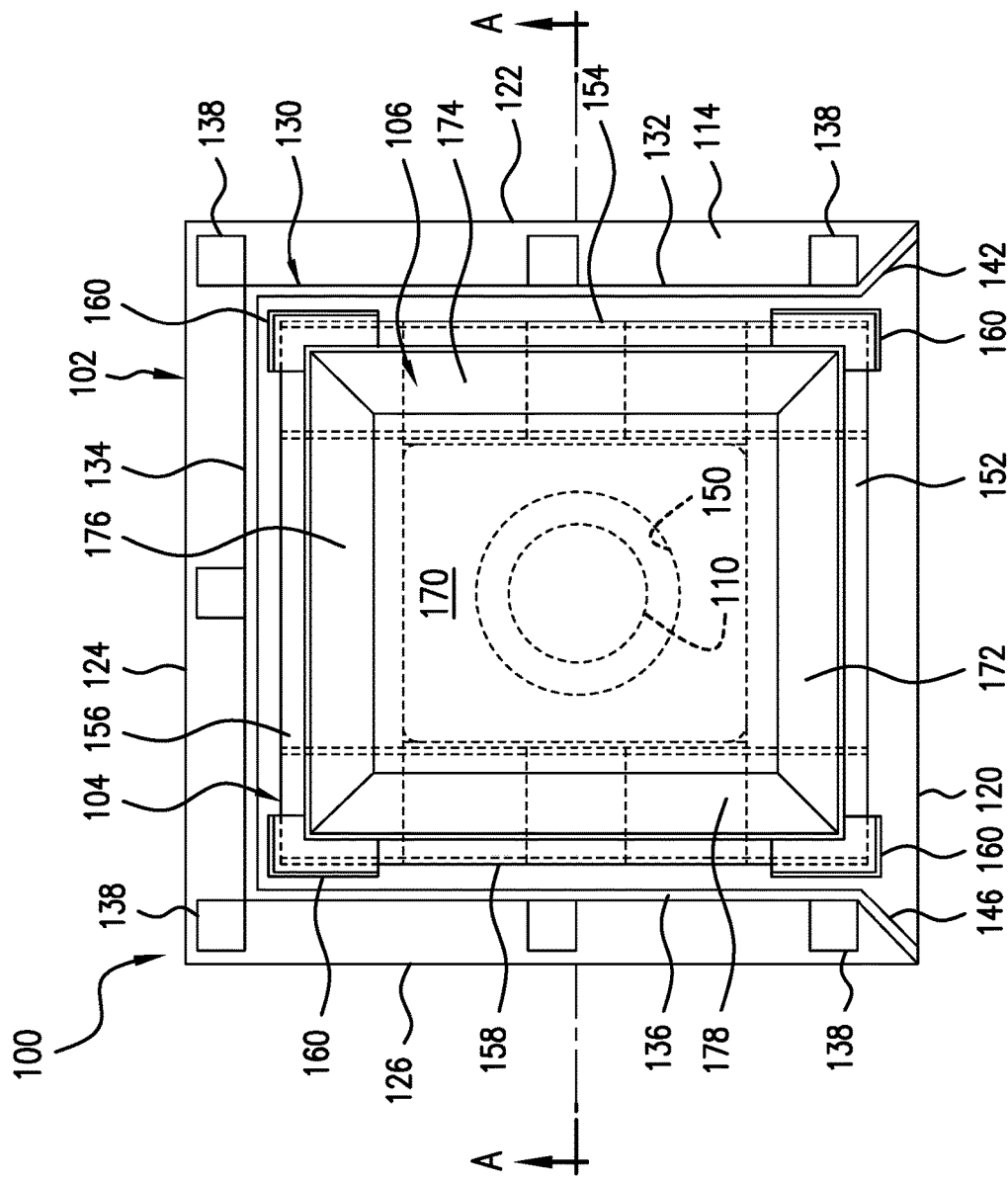
FIG. 4 is a top plan view of the exemplary self-leveling bin assembly.
Figure 5:
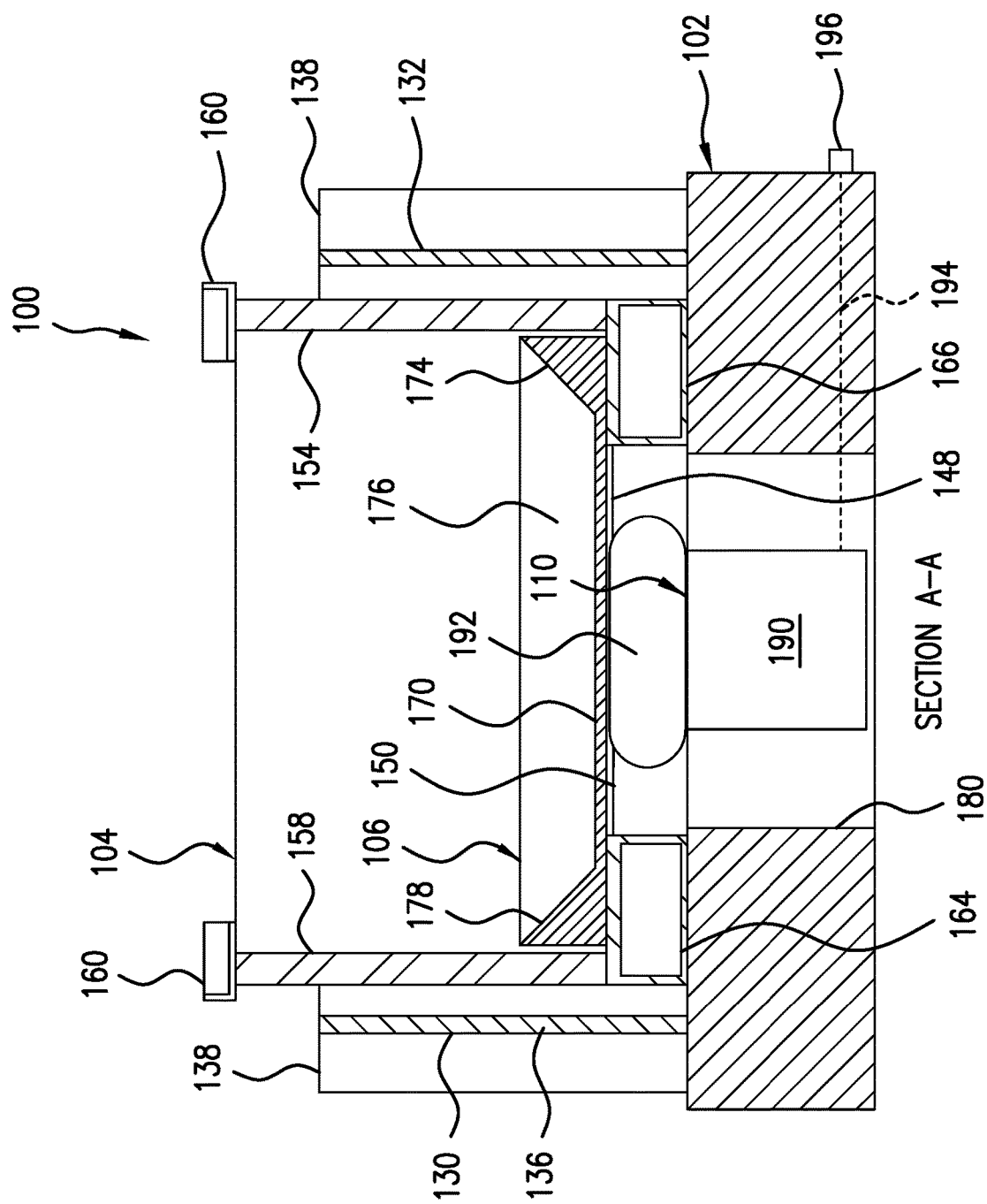
FIG. 5 is a cross-sectional view of FIG. 4 taken along line A-A of FIG. 4.

Further depicted in FIGS. 4 and 5, the movable parts tray 106 includes a bottom wall 170 and at least one sidewall 172 extending from the bottom wall 170. Again, it should be appreciated that the parts tray 106 is shaped corresponding to the shape of the bin 104. Therefore, the depicted parts tray 106 is rectangular shaped in top plan view and includes sidewalls 172, 174, 176, 178. In the depicted embodiment, each of the parts tray sidewalls is angled, for example, beveled shaped, so that material contained within the bin 104 moves away from the bin sidewalls as the parts tray 106 is raised within the bin 104 by the lifting mechanism 110. The height and angle of these sidewalls 172, 174, 176 and 178 are determined by the type and size of materials and parts being removed from the bin. The movable parts tray 106 can also be a different color (e.g., be painted a different color) than the sidewalls 152, 154, 156, 158 of the bin 104, which can be beneficial when used with the machine vision system of a robotic pick-up system.

The lifting mechanism 110 is at least partially positioned within an opening 180 defined centrally in the base 114 of the docking station 102. The lifting mechanism 110 is adapted to generally fit within the confines of the base 114 and raise or lift the parts tray 106 within the bin 104 as material is removed from the bin 104. As mentioned above, the bin 104 is shaped corresponding to the shape of the base 114, more particularly the fence 130, of the docking station 102. As such, the sidewalls 152, 154, 156, 158 of the bin 104 are appropriately dimensioned in top plan view such the bin 104 is received within the wall sections 132, 134, 136 of the fence 130 with the lower opening 150 of the bottom wall 148 of the bin 104 aligned with the opening 180 in the base 114 of the docking station. The bin 104 can be shaped such that when at least one of the sidewalls 152, 154, 156, 158 contacts a respective wall section 132, 134, 136 of the fence 130 while the wall 156 of the bin 104 is in contact with or closely adjacent to the wall section 134 of the fence 130, the lower opening 150 of the bottom wall 148 of the bin 104 is aligned with the opening 180 in the base 114 of the docking station.

According to one example, the lifting mechanism 110 can be a spring (for example, a pneumatic or hydraulic spring, a mechanical spring with or without a shock absorber, or mechanical screw actuator and the like) which extends vertically from the base 114 through the lower opening 150 in the bottom wall 148 of the bin 104 into engagement with the parts tray 106.

With reference to FIG. 5, the lifting mechanism 110 is schematically depicted as an air spring including a bottom assembly 190 and a bellows 192 connected to the bottom assembly. The air spring can be provided with a pneumatic pump (not shown) positioned within the bottom assembly 190, or the air spring can receive air from an external (pressurized) air source via an airline 194 (schematically depicted) connected with a fitting 196, which can connect with an external hose (not shown) connected with the external air source. Again, the lifting mechanism 110 can also be a mechanical mechanism, such as a scissor lift, or even tension springs connected with the sidewalls 152, 154, 156, 158 of the bin 104.

Figure 6:
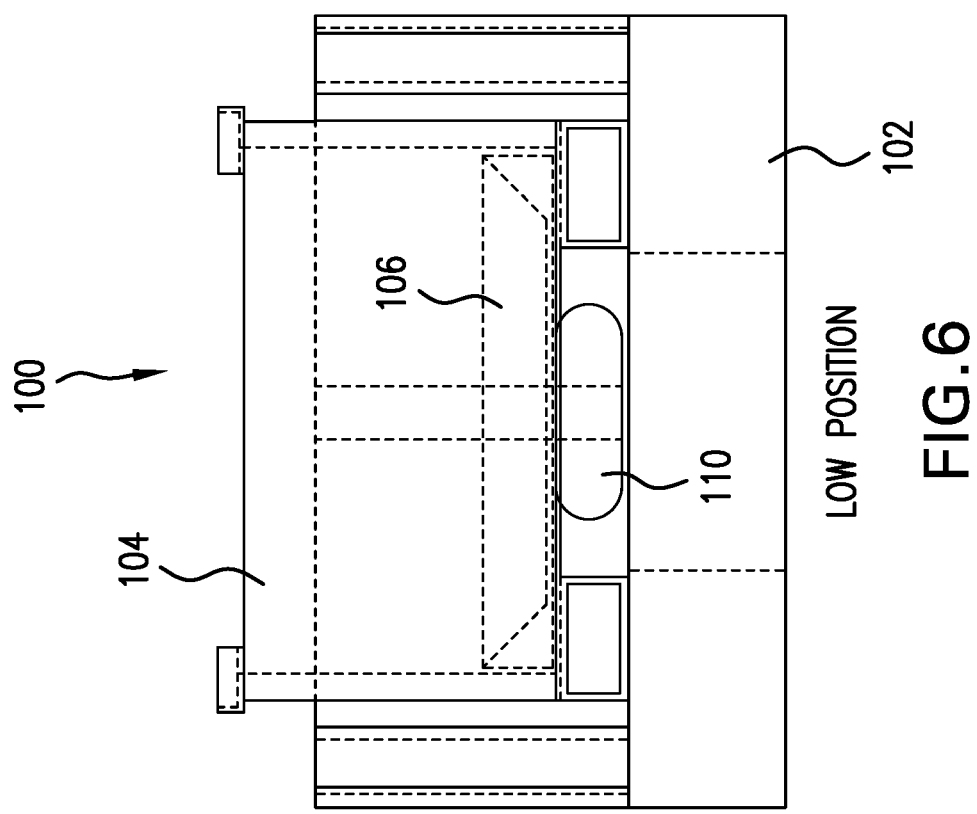
FIGS. 6-8 are side views of the exemplary self-leveling bin assembly at selected height positions.
Figure 7:
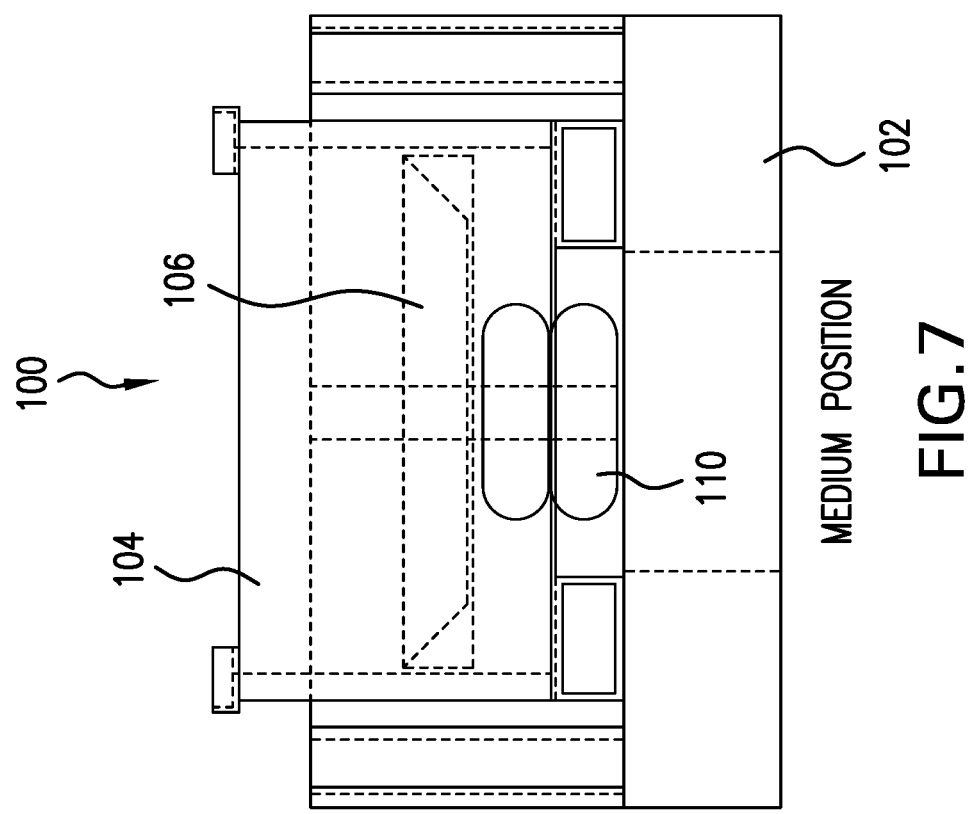
Figure 8:
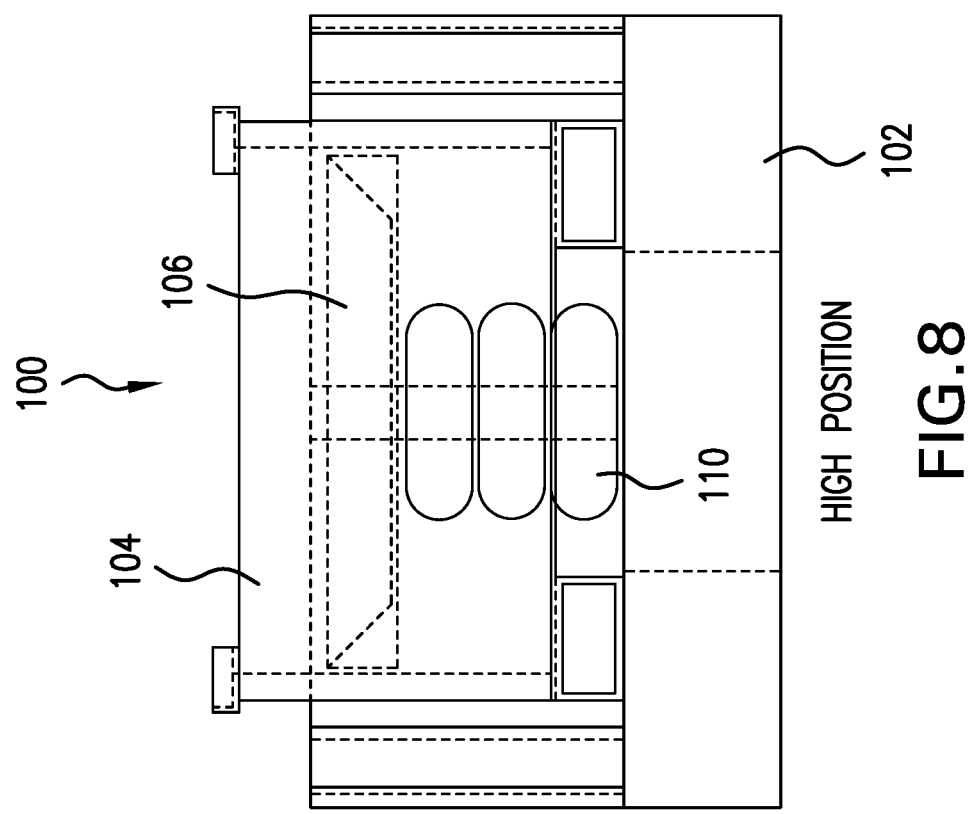

The lifting mechanism 110 is configured such that as parts are removed from the bin 104, the reduced weight causes the lifting mechanism 110 to move the parts tray 106 upward a predetermined distance so that the top layer of parts within the bin 104 remains at substantially the same level even though the number of parts within the bin 104 has decreased. When more parts reside in the bin 104 on the parts tray 106, the added weight will counteract the upward force applied by the lifting mechanism 110 such that the lifting mechanism 110 exerts sufficient additional upward force to stabilize the parts tray at, for example, a "low" or "medium" or "high" level or position (see FIGS. 6, 7 and 8). The magnitude of the upward force that is applied by the lifting mechanism 110 on the parts tray 106 and the position of the parts tray 106 within the bin 104 is based on the weight of the parts remaining in the bin 104. Further, it should be appreciated that by selecting a desired upward force magnitude applied by the lifting mechanism 110 on the parts tray 106, it is possible to make the extent of downward/upward movement of the parts tray 106 within the bin 104 correspond approximately to the extent of increase/decrease in the height of the parts within the bin 104. In other words, as parts are removed from the bin 104, the reduced weight of the remaining parts results in the parts tray 106 moving upward a predetermined distance so that the top layer of parts remains at the same level even though the weight of the parts within the bin 104 has decreased.

Accordingly, the present disclosure provides a self-leveling bin assembly 100 that includes a docking station 102, a bin 104 provided on the docking station, a parts tray 106 movably received in the bin, and a lifting mechanism 110 for raising the parts tray 106 within the bin 104 as material is removed from the bin. The angled sidewalls of the parts tray 106 is adapted to manipulate the parts for ease of removal of the material from the bin 104. The angled sidewalls of the parts tray 106 can offset the parts from the sidewalls 152, 154, 156, 158 of the bin 104, which can allow the machine vision system of a robotic pick-up system to more easily locate each part. When the bin 104 is properly aligned in or on the docking station 102, the lower opening 150 in the bottom wall 148 aligns with the opening 180 defined centrally in the base 114 of the docking station 102, which allows the lifting mechanism 110 to engage the parts tray 106, e.g., the bellows 192 in the embodiment depicted in FIG. 5 can contact the bottom wall 170 of the parts tray 106 through the lower opening 150 in the bottom wall 148.

Any term of degree used herein, such as "substantially", means a reasonable amount of deviation of the modified word is contemplated such that the end result is not significantly changed. For example, such terms can be construed as allowing a deviation of at least 5% of the modified word if this deviation would not negate the meaning of the word the term of degree modifies.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:
1. A self-leveling bin assembly comprising:
a docking station;
a bin received in or on the docking station;
a parts tray movably received in the bin; and
a lifting mechanism provided as part of the docking station and configured to lift the parts tray within the bin as associated material located on the parts tray is selectively removed,
wherein the docking station includes a base having a bottom wall, a top wall, and at least one sidewall extending between the bottom wall and the top wall, the top wall has an opening, and a fence sized to receive the bin is affixed to and extends substantially about a perimeter of the top wall.

2. The self-leveling bin assembly of claim 1, wherein the bin is shaped complementary to the docking station, the bin includes a bottom wall having a lower opening aligned with the opening in the base and at least one sidewall extending from the bottom wall.

3. The self-leveling bin assembly of claim 2, wherein a height dimension of the bin sidewall is greater than a height dimension of the fence sidewall.

4. The self-leveling bin assembly of claim 2, wherein the bin sidewall includes mounts configured for stacking of multiple associated bins, the mounts shaped to not intrude into an interior of the bin.

5. The self-leveling bin assembly of claim 2, wherein the parts tray is shaped complementary to the bin, the parts tray includes a bottom wall and at least one sidewall extending from the bottom wall, the at least one sidewall is beveled shape so that the associated material contained within the bin moves away from the bin sidewall as the parts tray is raised within the bin by the lifting mechanism.

6. The self-leveling bin assembly of claim 2, wherein the lifting mechanism is adapted to substantially fit within the confines of the base and is at least partially positioned within the opening of the base.

7. The self-leveling bin assembly of claim 6, wherein the lifting mechanism is configured as an pneumatic spring or hydraulic spring which extends vertically through both the base opening and the bin opening into direct engagement with the parts tray.

8. The self-leveling bin assembly of claim 1, wherein the lifting mechanism is configured such that as the associated material is removed from the bin, the lifting mechanism exerts upward force to move the parts tray upward to maintain a top layer of the associated material within the bin at a predetermined level.

9. The self-leveling bin assembly of claim 8, wherein the lifting mechanism is configured such that as the associated material is added to the bin, the lifting mechanism exerts upward force to stabilize the parts tray within the bin to maintain the top layer of the associated material within the bin at the predetermined level.

10. The self-leveling bin assembly of claim 1, wherein a pair of elongated channel-shaped supports is mounted to a bottom wall of the bin, the elongated supports configured to allow the bin to move into and out of the docking station.

11. A self-leveling bin assembly comprising:
a bin for receiving associated material therein, the bin including a bottom wall having a lower opening and at least one sidewall;
a parts tray seated on the bin bottom wall and movable within the bin, the parts tray including a bottom wall and at least one sidewall having a beveled shape; and
a lifting mechanism provided beneath the bin and configured to lift the parts tray within the bin as associated material located on the parts tray is selectively removed, wherein the beveled shape of the parts tray sidewall moves the associated material contained within the bin away from the bin sidewall as the parts tray is raised within the bin by the lifting mechanism;
wherein the lifting mechanism is provided as part of a docking station configured to support the bin, the docking station including a base having a bottom wall, a top wall, and at least one sidewall extending between the bottom wall and the top wall, the top wall has an opening for the lifting mechanism that is aligned with the lower opening of the bin.

12. The self-leveling bin assembly of claim 11, wherein the base further having a fence affixed to and extending substantially about a perimeter of the top wall, the fence sized to removably receive the bin.

13. The self-leveling bin assembly of claim 11, wherein the lifting mechanism is adapted to substantially fit within the confines of the base and is at least partially positioned within the opening of the base.

14. The self-leveling bin assembly of claim 13, wherein the lifting mechanism is configured as a pneumatic spring or hydraulic spring which extends vertically through both the base opening and the bin opening into direct engagement with the bottom wall of the parts tray.

15. The self-leveling bin assembly of claim 14, wherein the lifting mechanism is configured as a pneumatic spring, and the base includes a pneumatic fitting for connection to an associated external pressurized air source.

* * * * *